Nov. 26, 1968    O. I. BABIKOV ET AL    3,413,595
ULTRASONIC APPARATUS FOR CHECKING PROCESSES IN LIQUID MEDIA
Filed Oct. 27, 1966

$U_1 = U_2$
$F_x = \dfrac{F_{01} + F_{02}}{2}$ $U_1 > U_2$
$F_x < \dfrac{F_{01} + F_{02}}{2}$ $U_1 < U_2$
$F_x > \dfrac{F_{01} + F_{02}}{2}$

United States Patent Office 3,413,595
Patented Nov. 26, 1968

3,413,595
ULTRASONIC APPARATUS FOR CHECKING
PROCESSES IN LIQUID MEDIA
Oleg Ivanovich Babikov, Drezdenskaya ulits 10, korpus 2, kv. 60; Boris Ermolaevich Mikhalev, Nevsky prospect 153, kv. 10; Georgy Sergeevich Pol-Mari, Ulitsa Voinova 64, kv. 14; Jury Alexandrovich Lapshin, Ulitsa prof. Popova 43, kv. 5; and Vladimir Anatolievich Magnitsky, Prospect Geroev 26, kv. 78, all of Leningrad, U.S.S.R.
Filed Oct. 27, 1966, Ser. No. 589,912
4 Claims. (Cl. 340—5)

ABSTRACT OF THE DISCLOSURE

An instrument for the conversion of chemical or physical parameters of liquid media into a standard pneumatic or electric signal whose value is changed according to the change of the chosen parameter of the liquid medium being tested, and wherein the pulse repetition frequency of a generator, whose value is proportional to the velocity of ultrasonic waves in the liquid medium being tested is measured by means of a commutated circuit which is automatically readjusted by means of a servosystem. Correction for the temperature of the liquid medium under test is introduced directly into the commutated circuit. The ultrasonic echo signals from a receiving piezo electric element do not affect a generating piezoelectric element. A means being provided for amplifying the received signals and including a wide range automatic gain control to insure reliable operation of the apparatus in liquid media characterized by a highly variable rate of absorption of ultrasonic waves.

---

The present invention relates to apparatus intended for conversion of chemical or physical parameters of liquid media into a standard pneumatic or electric signal whose value is changed according to the change of a chosen parameter of the liquid media being tested.

More specifically, this invention relates to ultrasonic apparatus used in workshops of chemical plants for automatic checking, logging and control of such parameters of liquid media as concentration of solutions, specific gravity, rate of polymerization, e.g. in latexes, and an interface level of two non-miscible liquids. In order to meet the above-mentioned requirements the absolute value of the propagation velocity of ultrasonic waves in the liquid medium under test must uniquely depend upon the value of the parameter being checked.

There are known apparatus conductometers for providing a signal whose value is changed according to the change in the concentration of solutions.

However, the aforesaid apparatus, whose operating principle is based on the measurement of electrical resistance of the liquid medium being tested, do not insure a necessary accuracy when dealing with dielectrics.

There have been proposed ultrasonic apparatus employing the dependence of the propagation velocity of low-intensity ultrasonic waves on the liquid medium parameter being checked. In these apparatus the velocity of ultrasonic waves in the liquid medium under test is determined by measuring the pulse repetition frequency of an externally-synchronized ultrasonic generator, to whose input and output piezoelectric elements are connected, acoustically coupled to the liquid medium being tested. The measurement of the pulse repetition frequency of this generator is effected by coinciding the first harmonic of the pulse signal with a sinusoidal signal of a crystal-controlled oscillator with subsequent extraction of the difference frequency at the expense of storing a charge on a capacitor.

The known ultrasonic apparatus have the following disadvantages: their transducers must be equipped with a suitable device for changing the distance between the piezoelectric elements when calibrating the apparatus dial; direct measurement of the beat frequency with further production of a D.C. output signal does not insure sufficient accuracy; basically, it is not possible to determine the difference sign of the generator and heterodyne frequencies, which causes errors in the reading if the difference sign is changed; the device employed in the measuring unit of the apparatus to make correction for the temperature of liquid medium under test is very complicated.

Accordingly, an object of this invention is to provide an ultrasonic apparatus for checking processes in liquid media which is equipped with transducers having a constant distance between the piezoelectric elements.

Another object of the invention is to provide an ultrasonic apparatus for checking processes in liquid media, which has a higher accuracy and is reliable in operation.

A further object of the invention is to provide a comparatively simple ultrasonic apparatus for checking processes in liquid media which insures a compensating correction for the temperature of the liquid medium being tested.

Another object of the invention is to provide an ultrasonic apparatus for checking processes in liquid media which insures a quick and simple change of the measuring range so that it is usable in workshops of chemical and other plants.

The aforesaid and other objects of this invention are achieved by providing an ultrasonic apparatus for checking processes in liquid media in which measurement of the pulse repetition frequency of the generator is conducted by means of a commutated circuit, the value of said frequency being proportional to the velocity of ultrasonic waves in the liquid medium being tested; correction for the temperature of the liquid medium under test is introduced directly into the commutated circuit; the ultrasonic echo signals from the receiving piezoelectric element do not effect the generating piezoelectric element; and means is provided for amplifying the received signals which includes a wide range automatic gain control to insure reliable operation of the apparatus in liquid media characterized by a highly variable rate of absorption of ultrasonic waves.

The invention will be further described with reference to the accompanying drawin,s in which.

The ultrasonic check of processes in liquid media is based on a unique dependence of the propagation velocity of ultrasonic waves upon the value of the liquid medium parameter being checked in a given process.

Figure 1:
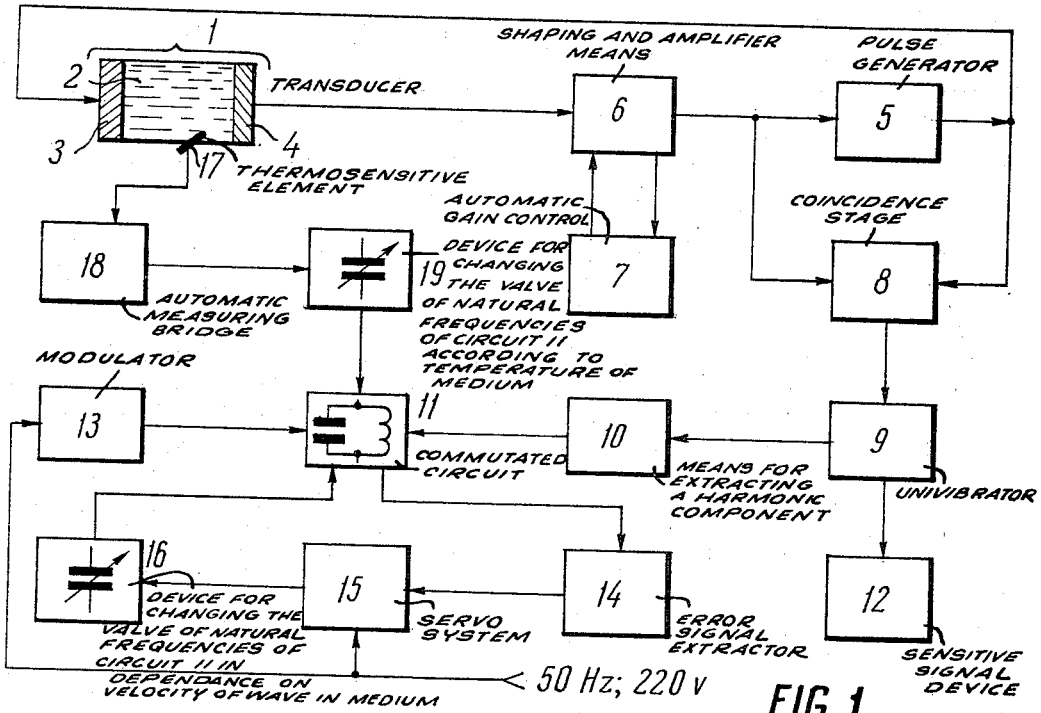
FIG. 1 is a block diagram of an ultrasonic apparatus according to the invention.

Transducer 1 (FIG. 1) of the apparatus is filled with liquid medium 2 to be tested or is immersed into it so that between said medium 2 and piezoelectric elements 3 and 4 (transmitting and receiving) an acoustical coupling is provided. An externally-synchronized self-oscillating pulse generator 5 produces a short electric pulse for exciting transmitting piezoelectric element 3 so that a short acoustic pulse is sent into liquid medium 2 being tested, the velocity of said acoustic pulse being, for example, a function of the concentration of any substance in said medium. On impinging against the receiving piezoelectric element 4, the acoustic pulse is converted into an electric signal. Due to double conversion and absorption in the liquid medium under test, the electric signal received by piezoelectric element 4 is weak; the necessary amplification of the received pulse is carried out with the aid of amplifying and shaping means 6. After that, the pulse is fed to the externally-synchronized input of generator 5 and triggers it. Generator 5 sends a further electric pulse to the transmitting piezoelectric element and the whole cycle is repeated. Thus, the cycle duration is a sum of the time during which the acoustic pulse passes the known distance between piezoelectric elements 3 and 4 of the transducer and the time during which the electric pulse flows through the electric circuits of the apparatus. The latter is two orders less than the former so that the time of sending of the pulse through the electric circuits might be ignored, therefore, the time during which the pulse passes through the medium being tested and the cycle duration, i.e. the pulse repetition frequency of generator 5, should be regarded as equal. On this assumption it is clear that the pulse repetition frequency of generator 5 is directly proportional to the propagation velocity of ultrasonic waves in the liquid medium being tested, the proportionality factor being a magnitude of the distance between piezoelectric elements 3 and 4 of the transducer. Thus, the problem of measurement of, for example, the concentration of a substance in the liquid medium under test is reduced to the measurement of the propagation velocity of ultrasonic waves in this medium. Next, the problem of the measurement of the velocity of ultrasonic waves is reduced to that of the measurement of the pulse repetition frequency of generator 5 through the above-mentioned closed system (pulse generator 5, transducer 1, and the means 6 for shaping and amplification). This operation is effected by the apparatus of the invention through the use of an unique circuit.

In order to stabilize the amplitude of the pulses at the externally-synchronize dinput of generator 5, shaping and amplifying means 6 are provided with a wide range negative feedback through the use of automatic gain control means 7. This insures steady conditions for triggering the generator and improves the accuracy of the apparatus as a whole.

In order to measure the repetition frequency of short pulses of generator 5 the pulses are fed through a coincidence stage 8 (the stage is described below) and applied to the input of a univibrator 9 which increases the duration of these pulses but does not change their repetition frequency. Such an operation increases the content of lower harmonic components in the pulse spectrum of generator 5. The pulses from the univibrator output are fed to the input of means 10 for extraction of a signal harmonic component of the spectrum, for example, the first component. After that, an electrical signal with a frequency of the extracted harmonic component is applied to a commutated circuit 11 whereby there is measured the pulse repetition frequency ($F_x$) of generator 5 or any multiple frequency of the chosen harmonic component ($2F_x$, $3F_x$, etc.).

The pulses of univibrator 9 are applied not only to the input of means 10 for extracting the harmonic component but also to the input of a sensitive signal device 12 which insures a light or sound signal in case of the absence of the pulses from the univibrator at the input of said signal device 12, which occurs when either univibrator 9 is faulty or the pulses of generator 5 are not applied to the input of coincidence stage 8. Coincidence stage 8 has two inputs, one of them being fed with the pulses from generator 5 and the other—with the pulses applied to the externally-synchronized input of generator 5 to trigger said generator. The above pulses are applied simultaneously to both inputs of coincidence stage 8. Under these conditions, the pulses of generator 5 pass through coincidence stage 8 and trigger univibrator 9. If normal operation of the units (1–8) is disturbed, the synchronous supply of the pulses to the inputs of coincidence stage 8 is broken, therefore, the pulses at the output of stage 8 and, accordingly, at the output of univibrator 9 are absent. In this case, sensitive signal device 12 produces a light or sound signal indicating that the apparatus is faulty.

Figure 2:
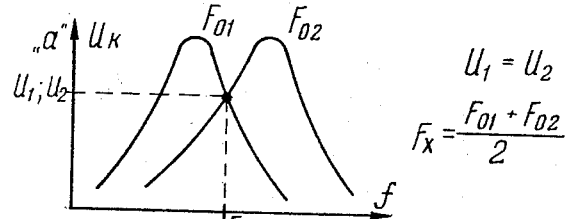
FIG. 2 shows the resonance characteristics of the commutated circuit of the apparatus shown in FIG. 1.
Figure 2:
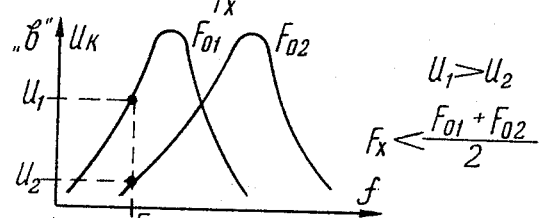
Figure 2:
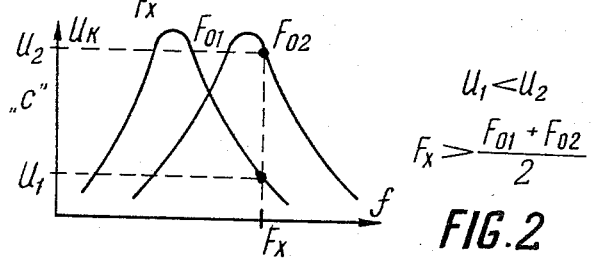

Commutated circuit 11 is modulated by a modulator 13 effecting periodic commutation with the power-supply frequency of an additional reactance to the circuit being commutated so that natural frequency $F_0$ of the circuit alternatively assumes two values $F_{01}$ and $F_{02}$, differing somewhat from each other. The frequency-response curves of circuit 11 in this instant are shown in FIG. 2.

The commutated circuit is essentially composed of a parallel connected capacitor and inductor, i.e. an ordinary LC parallel circuit with good stability of its parameters. Part of the reactances, for example, capacitors, function as elements for readjusting the natural frequency of the circuit 16 and 19, whereas other reactances, for instance, one or a group of capacitors are periodically commutated to the circuit with the power-supply frequency by means of the modulator's commutating element, in the capacity of which can be used either a vibrapack similar to vibrapacks employed in automatic bridges or potentiometers designed for measuring temperature, or diode-keys or transistors. There can be also used ferrite modulators or variacs, or any other known device used in radiotechnology for frequency modulation.

From the commutated circuit 11 an electrical signal with a frequency of the extracted harmonic component modulated to the power supply frequency is applied to the input of unit 14 intended for the extraction of an error signal. The error signal is fed to a servosystem 15 which is coupled with a unit 16 for changing natural frequencies $F_{01}$ and $F_{02}$ of commutated circuit 11. A variable capacitor may be used as unit 16.

If pulse repetition frequency $F_x$ of generator 5 to be measured, or more precisely, the frequency of the chosen harmonic component, is found to be at the intersection of the two resonance curves of the commutated circuit 11 (cf. FIG. 2"$a$"), the voltage applied to the circuit will not be modulated according to its amplitude, and the variable component of the signal at the output of an error detector will be equal to zero. In this case the error signal at the output of unit 14 and at the input of servosystem 15 is equal to zero, i.e. the whole system for measuring the pulse repetition frequency of generator 5 is balanced.

If frequency $F_x$ becomes less than the mean value of two natural frequencies $F_{01}$ and $F_{02}$ due to a decrease in the velocity of ultrasonic waves in the medium being tested, as shown in FIG. 2"$b$", the amplitude of oscillations in commutated circuit 11 is no longer constant, i.e. $U_1 > U_2$, being modulated by modulator 13 with the frequency of the power network. In this case, an error signal appearing at the input of servosystem 15 will make the latter affect unit 16 to change the values of natural frequencies $F_{01}$ and $F_{02}$ of commutated circuit 11 until the entire frequency measuring system returns to the state of equilibrium described above. In this case, a new value of $F_x$ corresponds to new values of $F_{01}$ and $F_{02}$.

If frequency $F_x$ exceeds the mean value of the two natural frequencies $F_{01}$ and $F_{02}$ due to an increase in the velocity of ultrasonic waves in the medium being tested, as shown in FIG. 2"$c$", the amplitude of oscillations in commutated circuit 11 is again no longer constant, but in this case $U_2 > U_1$, i.e. the phase of modulation has changed by 180° so that the error signal will make servosystem 15 and, therefore, unit 16 adjust circuit 11 in the reverse direction (as compared with case "$b$") until the entire system returns to the state of equilibrium.

The phase sensitivity of servosystem 15 is provided by supplying both the system and modulator 13 from a single A.C. network.

If the temperature of medium 2 under test is changed, the velocity of ultrasonic waves in this medium changes respectively, resulting in a temperature error in the readings. In order to rule out the temperature error a thermosensitive element 17 is built into transducer 1 and is electrically inserted into the circuit of an automatic measuring bridge 18. The latter is kinematically coupled to a unit 19 which changes the value of natural frequencies $F_{01}$ and $F_{02}$ of commutated circuit 11. A variable capacitor, similar to that used in unit 16, may be used as unit 19.

The apparatus readings, i.e. the position of the movable plate of the capacitor of unit 16 are independent of the temperature of the medium under test, provided the capacitance of the capacitor of unit 19 is changed depending upon the temperature of this medium.

Figure 3:
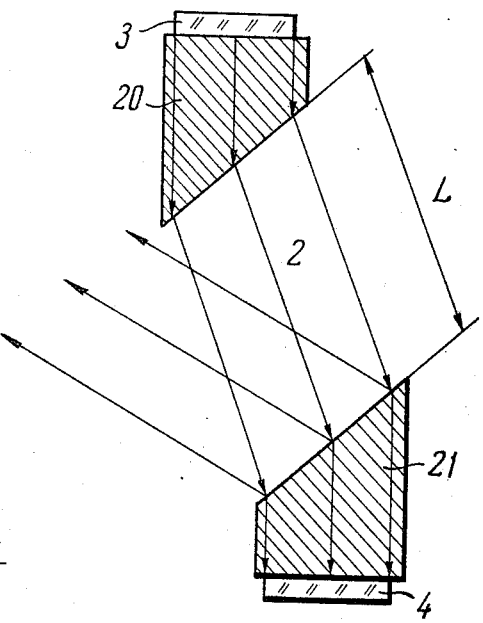
FIG. 3 shows the path of an ultrasonic signal through the prismatic diaphragms of the transducer of the apparatus shown in FIG. 1.

Piezoelectric elements 3 and 4 of transducer 1 are separated from medium 2 being tested by prismatic diaphragms 20 and 21, as shown in FIG. 3. These diaphragms utilize the refraction of the ultrasonic beam at the diaphragm-medium interface to eliminate the effect of the signal reflected from the receiving diaphragm, and then from the generating diaphragm, upon the receiving piezoelectric element. At the same time, as shown in FIG. 3, the direct signal freely passes from generating piezoelectric element 3 to receiving piezoelectric element 4 through medium 2 being tested. The separation of the direct and reflected signals rules out their mutual interference, thus increasing the accuracy of the measurement of the propagation velocity of ultrasonic waves in the medium being tested.

We claim:

1. An ultrasonic apparatus for checking processes in liquid media by measuring the absolute value of the propagation velocity of ultrasonic waves in the medium being tested, comprising: a transducer having at least two piezoelectric elements, generating and receiving ones, acoustically coupled to the liquid medium under test located between the piezoelectric elements; a pulse generator, said transducer being inserted between the input and output of said generator and used for producing ultrasonic signals which pass through the medium under test from one piezoelectric element to the other; means for amplifying and shaping the electric pulses appearing on said receiving piezoelectric element of the transducer; a univibrator connected to the output of said generator for increasing the duration of its output pulses, the repetition frequency of which pulses is proportional to the propagation velocity of ultrasonic signals in the medium being tested; means for extraction of a harmonic component of the pulses at the output of said univibrator; a commutated circuit receiving the extracted harmonic component of the univibrator pulses; a modulator connected to said circuit for commutating the latter between the two stable positions in which the circuit has different natural frequencies; means for changing the value of the natural frequencies of said circuit; means for extracting an error signal if the frequency of the extracted harmonic component of the univibrator pulses and the mean value of the natural frequencies of said circuit do not coincide; a servosystem connected to said means for extracting the error signal and coupled with said means for changing the natural frequencies of the circuit to provide coincidence of the extracted harmonic component of the univibrator pulses and the mean value of the natural frequencies of the circuit.

2. An ultrasonic apparatus for checking processes in liquid media by measuring the absolute value of the propagation velocity of ultrasonic waves in the medium under test, comprising: a transducer having at least two piezoelectric elements, generating and receiving ones, acoustically coupled with the medium under test located between the piezoelectric elements of the transducer; a pulse generator with said transducer inserted between the input and output of the generator, the transducer generating element being excited by the pulses from the generator and producing ultrasonic signals which pass to the receiving piezoelectric element through the medium being tested; means for shaping and amplifying the electric pulses appearing on said receiving piezoelectric element of the transducer, said means being connected to the input of said generator; a univibrator connected to the output of said generator for increasing the duration of the output signals of the generator; means for extracting a harmonic component of the pulses at the output of said univibrator; a commutated circuit receiving said extracted harmonic component of the pulses of the univibrator. a modulator connected to said circuit for commutating the latter between the two stable positions wherein the circuit has different natural frequencies; a first variable capacitor inserted into said circuit for changing the value of the natural frequencies; an automatic measuring bridge sensitive to the temperature of the medium being tested; a second variable capacitor controlled by said automatic bridge and connected to said first variable capacitor for changing the full capacitance of the commutated circuit according to the temperature variations of the medium being tested; means for extracting an error signal when the frequency of the extracted harmonic component of the pulses of said univibrator and the mean value of the natural frequencies of said circuit do not coincide; a servosystem responding to said error signal and controlling said first variable capacitor to provide coincidence of the frequency of the extracted harmonic component and the mean value of the natural frequencies of the circuit.

3. An ultrasonic apparatus for checking processes in liquid media by measuring the mean value of the propagation velocity of ultrasonic waves in the medium being tested, comprising: a transducer having two piezoelectric elements, generating and receiving ones, acoustically coupled with the medium being tested, said medium being located between the piezoelectric elements; prismatic diaphragms placed along the propagation path of the ultrasonic waves between said piezoelectric elements for separating the direct ultrasonic signal and the signal reflected from the receiving and generating piezoelectric elements so that the echo signals do not effect the receiving piezoelectric element; a pulse generator whose input is connected to the receiving piezoelectric element of said transducer, and the output is connected to the generating piezoelectric element; means for amplifying and shaping the electric pulses appearing on said receiving piezoelectric element, said means being connected to the input of said generator; a univibrator connected to the output of said generator for increasing the duration of its output pulses; means for extracting a harmonic component of the pulses of the univibrator; a commutated circuit receiving said extracted harmonic component; a modulator connected to said circuit for commutating the latter between the two stable positions wherein the circuit has different natural frequencies; means for changing the value of the natural frequencies of said circuit; means for extracting an error signal if the frequency of said extracted harmonic component does not coincide with the mean value of said natural frequencies of the circuit; a servosystem inserted between said means for extracting an error signal and the means for changing the natural frequencies of the circuit for insuring the coincidence of the frequency of said extracted harmonic component and the mean value of the natural frequencies of the circuit.

4. An ultrasonic apparatus for checking processes in liquid media by measuring the absolute value of the propagation velocity of ultrasonic waves in the medium being tested, comprising: a transducer having two piezoelectric elements, generating and receiving ones, acoustically coupled with the medium being tested; a pulse generator whose input is connected to said receiving piezoelectric element, and the output is connected to said generating piezoelectric element producing direct ultrasonic signals under the action of the pulses of the generator; prismatic diaphragms located along the path of the propagation of the direct ultrasonic signals through the medium being tested for separating the direct ultrasonic signals from the signals reflected from the receiving piezoelectric element, the receiving piezoelectric element being unaffected by the echo signals; means for amplifying and shaping the electric pulses appearing on said receiving piezoelectric element, said means being connected to the input of said generator; automatic gain control means for providing a constant value of the output signal of said amplifying means in case of a change in the absorption of the ultrasonic signals in the medium being tested; a coincidence circuit inserted between the input and output of said generator for producing a control signal when the input and output pulses of the generator are synchronously applied to said coincidence circuit; a univibrator connected to the output of said generator through said coincidence circuit; a sensitive signal device connected to the output of said univibrator and responding to the above control signal of the coincidence circuit; means for extracting a harmonic component of the output pulses of said univibrator; a commutator circuit receiving said extracted harmonic component; a modulator connected to said circuit for commutating the latter between the two stable positions wherein the circuit has different natural frequencies; means for extracting an error signal if the frequency of said extracted harmonic component does not coincide with the mean value of the natural frequencies of the circuit; a servosystem inserted between said means for extracting an error signal and the means for changing the natural frequencies of the circuit for providing coincidence of the frequency of said extracted harmonic component and the mean value of the natural frequencies of the circuit.

References Cited

UNITED STATES PATENTS

| 2,949,772 | 8/1960 | Kritz | 73—194 |
| 3,087,138 | 4/1963 | Toulis | 181—.5 |
| 3,115,615 | 12/1963 | Saper | 340—3 |

RICHARD A. FARLEY, *Primary Examiner.*